(12) United States Patent
Song et al.

(10) Patent No.: US 10,825,184 B2
(45) Date of Patent: Nov. 3, 2020

(54) MAXIMUM CONNECTED DOMAIN MARKING METHOD, TARGET TRACKING METHOD, AND AUGMENTED REALITY/VIRTUAL REALITY APPARATUS

(71) Applicant: BOE TECHNOLOGY GROUP CO., LTD., Beijing (CN)

(72) Inventors: Zhenkun Song, Beijing (CN); Quan Yang, Beijing (CN); Hongzhen Xue, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 116 days.

(21) Appl. No.: 15/925,497

(22) Filed: Mar. 19, 2018

(65) Prior Publication Data

US 2019/0147597 A1 May 16, 2019

(30) Foreign Application Priority Data

Nov. 14, 2017 (CN) .......................... 2017 1 1127992

(51) Int. Cl.
*G06T 7/11* (2017.01)
*G06T 7/246* (2017.01)
(Continued)

(52) U.S. Cl.
CPC ............ *G06T 7/187* (2017.01); *G02B 27/017* (2013.01); *G06T 5/002* (2013.01); *G06T 5/30* (2013.01);
(Continued)

(58) Field of Classification Search
CPC ... G06T 7/11; G06T 7/12; G06T 5/002; G06T 5/001; G06T 5/003; G06T 5/004;
(Continued)

(56) References Cited

U.S. PATENT DOCUMENTS

2003/0053689 A1* 3/2003 Watanabe ............... G06T 5/004
382/167
2008/0170756 A1* 7/2008 Beucher .................. G01V 1/32
382/109

(Continued)

FOREIGN PATENT DOCUMENTS

CN 101499169 A 8/2009
CN 101630414 A 1/2010

(Continued)

OTHER PUBLICATIONS

First Chinese Office Action dated Aug. 28, 2019, received for corresponding Chinese Application No. 201711127992.4, 19 pages.

*Primary Examiner* — Dwayne D Bost
*Assistant Examiner* — Stephen M Brinich
(74) *Attorney, Agent, or Firm* — Kinney & Lange, P.A.

(57) ABSTRACT

Embodiments of the present disclosure provide a maximum connected domain marking method, a target tracking method and an AR (Augmented Reality)/VR (Virtual Reality) apparatus, and relate to the field of image processing technology, and can obtain the maximum connected domain. A maximum connected domain marking method comprises: marking connected domains of pixels of a binary image and recording equivalent relationships; merging the equivalent connected domains according to the equivalent relationships, for pixels with the equivalent relationships in the marked results; counting the number of pixels in each merged connected domain; determining a connected domain label for the maximum connected domain according to the counted number of pixels in each connected domain; and determining coordinates of boundary pixels in the maximum connected domain based on the connected domain label.

8 Claims, 4 Drawing Sheets

(51) Int. Cl.
  *G06T 7/187* (2017.01)
  *G06T 7/136* (2017.01)
  *G06T 19/00* (2011.01)
  *G06T 5/00* (2006.01)
  *G02B 27/01* (2006.01)
  *G06T 5/30* (2006.01)

(52) U.S. Cl.
  CPC ............... *G06T 7/11* (2017.01); *G06T 7/136* (2017.01); *G06T 7/246* (2017.01); *G06T 19/006* (2013.01); *G06T 2207/20221* (2013.01)

(58) Field of Classification Search
  CPC ........... G06T 5/30; G06T 5/20; G06T 19/006; G02B 27/01
  USPC ....... 382/100, 103, 195, 199, 181, 192, 204, 382/237
  See application file for complete search history.

(56) References Cited

U.S. PATENT DOCUMENTS

| | | | | |
|---|---|---|---|---|
| 2012/0128248 A1* | 5/2012 | Hamada | .................... | G06K 9/34 382/173 |
| 2015/0036921 A1* | 2/2015 | Lu | ...................... | G06K 9/00664 382/159 |
| 2015/0373331 A1 | 12/2015 | Krutsch et al. | | |

FOREIGN PATENT DOCUMENTS

| | | |
|---|---|---|
| CN | 104992451 A | 10/2015 |
| CN | 105261049 A | 1/2016 |

\* cited by examiner

| Label1 (x-1,y-1) | label2 (x-1,y) | label3 (x-1,y+1) |
|---|---|---|
| label4 (x,y-1) | Labelx (x,y) | |

MAXIMUM CONNECTED DOMAIN MARKING METHOD, TARGET TRACKING METHOD, AND AUGMENTED REALITY/VIRTUAL REALITY APPARATUS

CROSS-REFERENCE TO RELATED APPLICATION(S)

This application claims priority to the Chinese Patent Application No. 201711127992.4, filed on Nov. 14, 2017, entitled "MAXIMUM CONNECTED DOMAIN MARKING METHOD, TARGET TRACKING METHOD, AND AUGMENTED REALITY/VIRTUAL REALITY APPARATUS," which is incorporated herein by reference in its entirety.

TECHNICAL FIELD

The present disclosure relates to the field of image processing technology, and more particularly, to a maximum connected domain marking method, a target tracking method, and an AR (Augmented Reality)/VR (Virtual Reality) apparatus.

BACKGROUND

Connected domain marking is an important step in machine vision, target recognition, and tracking applications. The purpose of the connected domain marking is to find connected areas in a binary image and assign a different label for each connected area.

At present, only the centroid positions of all connected domains can be obtained for the connected domain marking, or only all the connected domains are marked.

SUMMARY

The embodiments of the present disclosure provide a maximum connected domain marking method, a target tracking method and an AR (Augmented Reality)/VR (Virtual Reality) apparatus.

According to a first aspect of the present disclosure, there is provided a maximum connected domain marking method, comprising marking connected domains of pixels of a binary image and recording equivalent relationships, merging the equivalent connected domains according to the equivalent relationships for pixels with equivalent relationships in the marked results, storing the final marked results for all the pixels in a memory, and counting the number of pixels in each connected domain; determining a connected domain label for the maximum connected domain according to the counted number of pixels in each connected domain; sequentially reading the connected domain labels stored in the memory, at the same time, generating row counts and column counts, and recording the coordinates of all the pixels in the first row and the last row in the maximum connected domain and the coordinates of two boundary points on the left and right of the middle rows; wherein coordinates include the row count and the column count for a corresponding pixel.

In some embodiments of the present disclosure, marking connected domains of pixels of a binary image and recording equivalent relationships, merging the equivalent connected domains according to the equivalent relationships for pixels with equivalent relationships in the marked results, storing the final marked results for all the pixels in a memory, and counting the number of pixels in each connected domain may include: traversing the pixels of the binary image row by row, marking the connected domain label of each of the pixels and recording the equivalent relationships, wherein the equivalent relationships comprise intra-row equivalent relationships and inter-row equivalent relationships; when marking connected domains of pixels in the $i^{th}$ row and recording the equivalent relationships, updating the connected domain labels of the pixels in the $(i-1)^{th}$ row according to the inter-row equivalent relationships existing between the pixels in the $(i-1)^{th}$ row and the pixels in the $i^{th}$ row; before marking connected domains of pixels in the $(i+1)^{th}$ row and recording the equivalent relationships, updating the connected domain labels of the pixels in the $i^{th}$ row according to the intra-row equivalent relationships existing between the pixels in the $i^{th}$ row; storing the marked results of the pixels in the $(i-1)^{th}$ row in the memory and counting the number of pixels included in each connected domain in the memory according to the connected domain labels; obtaining the number of pixels included in all connected domains until the final marked results of the pixels in the $N^{th}$ row is stored in the memory; wherein i has a value in a range from 2 to N, and N is the total row number of pixels of the binary image.

In some embodiments of the present disclosure, the binary image may be obtained by binarizing a grayscale image using an adaptive threshold binarization method.

Binarizing the grayscale image using the adaptive threshold binarization method may include: counting the number of white pixels in the previous frame of the image which is binarized; if the number of the white pixels is greater than the maximum number of white pixels, using (the threshold for the previous frame−a) as the threshold for the current frame for binarizing the grayscale image of the present frame; if the number of the white pixels is smaller than the minimum number of white pixels, using (the threshold for the previous frame+a) as the threshold for the current frame for binarizing the grayscale image of the present frame; otherwise assigning the threshold for the previous frame to the threshold for the current frame and binarizing the grayscale image of the present frame; wherein the threshold for the previous frame is a threshold used when binarizing the grayscale image of the previous frame, and a is a step for threshold adjustment.

In some embodiments of the present disclosure, marking connected domain labels of the pixels may include: determining whether the gray value of the pixel is zero; if the gray value of the pixel is zero, then marking the connected domain label of the pixel as zero; if the gray value of the pixel is not zero, then acquiring the smallest and non-zero connected domain label in four neighboring pixels of the pixel as the connected domain label of the pixel; otherwise assigning a connected domain label that is greater than any of the existing connected domain labels to the pixel; wherein the four neighboring pixels of the pixel having a coordinate (x, y) are pixels having coordinates (x−1, y−1), (x−1, y), (x−1, y+1) and (x, y−1), respectively, where x is the row number of the pixel in the binary image, and y is the column number of the pixel in the binary image.

In some embodiments of the present disclosure, recording the equivalent relationships may include: determining whether the connected domain labels of the pixel having the coordinates (x, y−1) and (x−1, y+1) are zero, respectively, when the connected domain label of the pixel having the coordinate (x, y) is not zero; if not zero, and the connected domain labels of the corresponding pixels and the pixel having the coordinate (x, y) are not equal, recording the equivalent relationship between the two connected domain labels; wherein if the two connected domain labels with the equivalent relationship are located in the same row, they have the intra-row equivalent relationship, and if the two connected domain labels with the equivalent relationship are located in adjacent rows, they have the inter-row equivalent relationship.

In some embodiments of the present disclosure, updating the connected domain labels of the pixels in the $(i-1)^{th}$ row according to the inter-row equivalent relationships existing between the pixels in the $(i-1)^{th}$ row and the pixels in the $i^{th}$ row may include: according to the inter-row equivalent relationships existing between the pixels in the $(i-1)^{th}$ row and the pixels in the $i^{th}$ row, changing a greater connected domain label in the pixel in the $(i-1)^{th}$ row to its equivalent smaller connected domain label; and updating the connected domain labels of the pixels in the $i^{th}$ row according to the intra-row equivalent relationships existing between the pixels in the $i^{th}$ row may include: according to the intra-row equivalent relationships existing between the pixels in the $i^{th}$ row, changing a greater connected domain label in the pixel in the $i^{th}$ row to its equivalent smaller connected domain label.

In some embodiments of the present disclosure, when marking connected domains of pixels in the $i^{th}$ row and recording the equivalent relationships, updating the connected domain labels of the pixels in the $(i-1)^{th}$ row according to the inter-row equivalent relationships existing between the pixels in the $(i-1)^{th}$ row and the pixels in the $i^{th}$ row may include: when marking the connected domains of pixels in the $i^{th}$ row and recording the equivalent relationships, transferring the connected domain labels of pixels in the $(i-1)^{th}$ row once between two shift registers, and in the transferring process, updating the connected domain labels of the pixels in the $(i-1)^{th}$ row according to the inter-row equivalent relationships existing between the pixels in the $(i-1)^{th}$ row and the pixels in the $i^{th}$ row.

Before marking connected domains of pixels in the $(i+1)^{th}$ row and recording the equivalent relationships, updating the connected domain labels of the pixels in the $i^{th}$ row according to the intra-row equivalent relationships existing between the pixels in the $i^{th}$ row may include: before marking the connected domains of pixels in the $(i+1)^{th}$ row and recording the equivalent relationships, transferring the connected domain labels of pixels in the $i^{th}$ row once between two shift registers, and in the transferring process, updating the connected domain labels of the pixels in the $i^{th}$ row according to the intra-row equivalent relationships existing between the pixels in the $i^{th}$ row.

In some embodiments of the present disclosure, marking connected domains of pixels of a binary image and recording equivalent relationships, merging the equivalent connected domains according to the equivalent relationships for pixels with equivalent relationships in the marked results, storing the final marked results for all the pixels in a memory, and counting the number of pixels in each connected domain may include:

S1: in the scan stage for the first row of pixels, traversing the first row of pixels from left to right one by one, marking the connected domain label of each of the pixels and recording the equivalent relationships, and sequentially inputting the initial marked results to a first shift register;

S2: in the scan stage for the second row of pixels, traversing the second row of pixels from left to right one by one, marking the connected domain labels of each of the pixels and recording the equivalent relationships, and sequentially inputting the marked results to the first shift register, at the same time, an output terminal of the first shift register sequentially outputs the initial marked results of the pixels in the first row, and updating the connected domain labels of the pixels in the first row according to the inter-row equivalent relationships existing between the pixels in the first row and the pixels in the second row, to obtain the finally marked results and sequentially inputting the same to a second shift register;

S3: in the transitional stage for adjacent row scan, the first shift register is written with zero data while the output terminal of the first shift register sequentially outputs the initial marked results of the pixels in the second row, and according to the intra-row equivalent relationship between the pixels in the second row, the connected domain labels of the pixels in the second row are updated to obtain the intermediate marked results and sequentially input the same to the second shift register; the output terminal of the second shift register sequentially outputs the final marked results of the pixels in the first row to be stored in the memory, and the number of pixels included in each connected domain in the memory is counted according to the connected domain labels;

S4: in the scan stage for the third row of pixels, traversing the third row of pixels from left to right one by one, marking the connected domain label of each of the pixels and recording the equivalent relationships, and sequentially inputting the initial marked results to the second shift register, at the same time, the output terminal of the second shift register sequentially outputs the intermediate marked results of the pixels in the second row; and updating the connected domain labels of the pixels in the second row according to the inter-row equivalent relationships existing between the pixels in the second row and the pixels in the third row, to obtain the finally marked results and sequentially inputting the same to the first shift register;

S5: in the transitional stage for adjacent row scan, the second shift register is written with zero data while the output terminal of the second shift register sequentially outputs the initial marked results of the pixels in the third row, and according to the intra-row equivalent relationship between the pixels in the third row, the connected domain labels of the pixels in the third row are updated to obtain the intermediate marked results and sequentially input the same to the first shift register; the output terminal of the first shift register sequentially outputs the final marked results of the pixels in the second row to be stored in the memory, and the number of pixels included in each connected domain in the memory is counted; and wherein S4-S5 are performed on each subsequent row of pixels, wherein, when traversing the $M^{th}$ row of pixels, the initial marked results for the pixels in the $M^{th}$ row are sequentially input into a non-zero shift register, $4 \leq M \leq N$; the number of pixels included in all the connected domains is obtained until the final marked results of the pixels in the last row are stored in the memory.

In some embodiments of the present disclosure, before the binarization processing is performed on a grayscale image to obtain the binary image, the method may further include: performing cropping and noise reduction processing on the grayscale image.

In some embodiments of the present disclosure, before marking connected domains of pixels of the binary image and recording the equivalent relationships, the method may further include: performing erosion and dilation processing on the binary image.

According to a second aspect of the present disclosure, there is provided a target tracking method, comprising: calculating a position coordinate of a center of a target center according to the maximum connected domain obtained by the method as in the first aspect and the coordinates of all its boundary points.

In some embodiments of the present disclosure, the binary image may be obtained by binarizing a grayscale image of an eye; the grayscale image may be an eye image acquired by an image sensor; or, the grayscale image may be an image converted from an eye image acquired by an image sensor.

When binarizing the grayscale image, for a pixel whose gray value is greater than a threshold, the gray value is set to 0; and for a pixel whose gray value is less than the threshold, the gray value is set to 1.

According to a third aspect of the present disclosure, there is provided a computer device, comprising a storage unit and a processing unit; the storage unit stores a computer program that can run on the processing unit and stores marked results; and the processing unit implements the method as in the first aspect or the second aspect when executing the computer program.

According to a fourth aspect of the present disclosure, there is provided a computer-readable medium storing a computer program, wherein the computer program is executed by a processor to implement the method as in the first aspect or the second aspect.

According to a fifth aspect of the present disclosure, there is provided an augmented reality/virtual reality apparatus, comprising an augmented reality/virtual reality body, a camera disposed inside the augmented reality/virtual reality body, a storage unit and a processing unit disposed on the augmented reality/virtual reality body; the camera is configured to capture an eye image; the storage unit stores a computer program executable on the processor; and the processing unit implements the method as in the second aspect when executing the computer program.

In some embodiments of the present disclosure, the processing unit may include a Field Programmable Gate Array (FPGA).

BRIEF DESCRIPTION OF THE DRAWINGS

In order to more clearly illustrate the technical solutions of the embodiments of the present disclosure and in the related art, the accompanying drawings of the embodiments or the related art will be briefly described below. It is obvious that the accompanying drawings described below are merely some embodiments of the present disclosure and for those skilled in the art, other drawings can also be obtained according to these drawings without any creative effort, wherein in the accompanying drawings.

DETAILED DESCRIPTION

The technical solutions according to the embodiments of the present disclosure will be described clearly and completely below in conjunction with the accompanying drawings. Obviously, the described embodiments are merely a part of the embodiments of the present disclosure, instead of all the embodiments. All other embodiments obtained by one of ordinary skill in the art based on the described embodiments without contributing any creative labor are also within the scope of the present disclosure.

Figure 1:
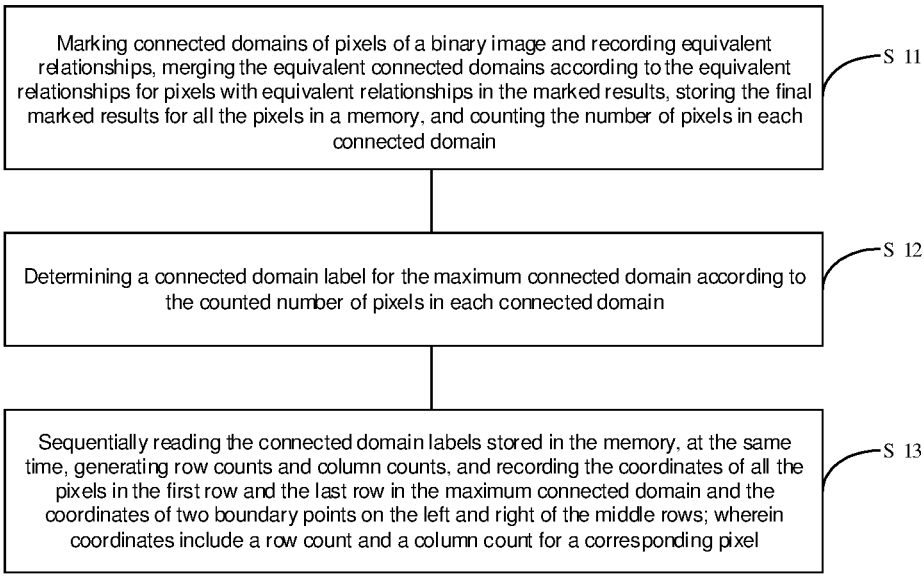
FIG. 1 is a schematic flow chart of an example of a maximum connected domain marking method according to an embodiment of the present disclosure.

An embodiment of the present disclosure provides a maximum connected domain marking method, as shown in FIG. 1, comprising:

S11, for marking connected domains of pixels of a binary image and recording equivalent relationships, merging the equivalent connected domains according to the equivalent relationships for pixels with equivalent relationships in the marked results, and counting the number of pixels in each connected domain. In addition, the final marked results for all the pixels may be stored in a memory.

S12, for determining a connected domain label for the maximum connected domain according to the counted number of pixels in each connected domain.

S13, for sequentially reading the connected domain labels stored in the memory, at the same time, generating row counts and column counts, and recording the coordinates of all the pixels in the first row and the last row in the maximum connected domain and the coordinates of two boundary points on the left and right of the middle rows; wherein the coordinates include the row count and the column count for the corresponding pixel.

It may be understood that in order to ensure the accuracy of the coordinates of the boundary points of the read maximum connected domain, the labels for the connected domains of the pixels should be stored in the memory in a certain order, so that when reading, sequentially reading may be performed according to the storing order, so as to ensure that the coordinates of the boundary points of the maximum connected domain that is read are the coordinates of the boundary pixels of the maximum connected domain in the corresponding binary image.

As an example, the labels for the connected domains of the pixels may be stored in the memory in an order from left to right and from top to bottom. That is, from the first row, the labels for the connected domains of the pixels in the first column, the second column, the third column . . . and the last column may be sequentially stored in the memory. Afterwards, from the second row, the labels for the connected domains of the pixels in the first column, the second column, the third column . . . and the last column may be sequentially stored in the memory, and so on, until the labels for the connected domains of the last column of pixels in the last row is stored in the memory. However, the present disclosure is not limited thereto, and the orders of storing and reading may also be other specified orders, for example, from right to left and from bottom to top, or from right to left and from top to bottom, or even from a middle row.

In some embodiments, the memory may be a RAM (Random Access Memory). However, the present disclosure is not limited thereto.

As such, in the above example from left to right and from top to bottom, when reading the labels for the connected domains stored in the memory, row counts and column counts are generated in the storing order. That is, the label for the first connected domain that is read has a row count Row 1 and a column count Column 1; the label for the second connected domain that is read has a row count Row 1 and a column count Column 2; . . . ; the label for the $K^{th}$ (it is assumed that K is less than or equal to the number of columns of pixels in the binary image) connected domain that is read has a row count Row 1 and a column count Column K. If K is equal to the number of columns of pixels in the binary image, the label for the $(K+1)^{th}$ connected domain that is read has a row count incremented by 1, and its column count is set to 1, so that the row count is Row 2, and the column count is Column 1. Afterwards, provided that the label for the (integer multiples of K)$^{th}$ connected domain is read, when reading the next one, the row count will be accumulated by 1, and the column count will be set to 1. If the label for a certain connected domain that is read is equal to the label for the maximum connected domain, then the row count and column count values are the coordinates of the corresponding pixel in the maximum connected domain, and the coordinates of all the pixels in the first row and the last row in the maximum connected domain and the coordinates of two boundary points on the left and right of the middle rows are to be recorded.

It should be noted that, because the conflict on the connected domain label may appear in the same connected domain, that is, the connected domain labels of pixels in the same connected domain are not exactly the same, while marking the connected domains of pixels, it is necessary to record whether there is an equivalent relationship with the adjacent pixels. As such, for pixels with equivalent relationships in the marked results, the equivalent connected domains may be merged according to the equivalent relationships, so that the connected domain labels of pixels in the same connected domain are exactly the same. Herein, the equivalent relationships may include intra-row equivalent relationships and inter-row equivalent relationships.

According to an embodiment of the present disclosure, there is provided a maximum connected domain marking method. In the method, equivalent relationships are recorded in the process of marking connected domains of pixels, and the equivalent connected domains are merged according to the equivalent relationships before being stored in the memory to remove the conflict labels, so that the connected domain labels of pixels in the same connected domain are the same to ensure the accuracy of recognizing the maximum connected domain. On the basis of above, the coordinates of all the boundary points in the maximum connected domain may be obtained by sequentially reading the connected domain labels stored in the memory and generating row counts and column counts simultaneously, so as to obtain an image of the maximum connected domain in the image. Since the coordinates of the position of the center of the pupil of the eye can be calculated according to the coordinates of all the boundary points in the maximum connected domain, the present disclosure concept may be applied to an augmented reality/virtual reality apparatus to achieve pupil tracking.

In addition, in the threshold binarization method for grayscale images, it is determined whether each pixel is a black pixel or a white pixel by comparing grayscale value of each pixel with a grayscale threshold. For example, in the case that the grayscale value of the current pixel is higher than the threshold, the current pixel may be determined as a black pixel. For another example, in the case that the grayscale value of the current pixel is lower than the threshold, the current pixel may be determined as a white pixel. However, the present disclosure is not limited thereto.

In some embodiments, the binary image may be obtained by binarizing the grayscale image using an adaptive threshold binarization method. However, the present disclosure is not limited thereto, and any other suitable binarization method may be used.

Binarizing the grayscale image using an adaptive threshold binarization method may include: counting the number of white pixels in the previous frame of the image which is binarized; if the number of the white pixels is greater than the maximum number of white pixels, using (the threshold for the previous frame−a) as the threshold for the current frame for binarizing the grayscale image of the present frame; if the number of the white pixels is smaller than the minimum number of white pixels, using (the threshold for the previous frame+a) as the threshold for the current frame for binarizing the grayscale image of the present frame; otherwise, assigning the threshold for the current frame to the threshold for the previous frame and binarizing the grayscale image of the present frame. Wherein the threshold for the previous frame is a threshold used when binarizing the grayscale image of the previous frame, and a is a step for threshold adjustment.

It should be understood that binarizing the grayscale image of the present frame is based on the threshold for the previous frame used when the grayscale image of the previous frame for the present frame is binarized and dependent on the relationship between the number of white pixels in the previous frame of the image and the preset maximum number of white pixels or the minimum number of white pixels to determine to add a, subtract a, or not add or subtract. However, the present disclosure is not limited thereto. The grayscale threshold for the current frame may be synthetically determined based on the thresholds for one or more previous frames (e.g., using weighting coefficients), and these previous frames are not necessarily successive frames.

In the case where the distance between the image sensor and the target such as the pupil is constant, the number of the white pixels in each frame of the image may be obtained by acquiring the grayscale images of a plurality of frames to obtain the maximum number of white pixels and the minimum number of white pixels.

If the distance between the image sensor and the target is constantly changing, the maximum number of white pixels and the minimum number of white pixels cannot be accurately obtained. Therefore, it is necessary to obtain the maximum number of white pixels and the minimum number of white pixels after the distance between the image sensor and the target is determined. On this basis, the binary image can be obtained accurately by binarizing the grayscale images using the adaptive threshold binarization method.

Figure 2:
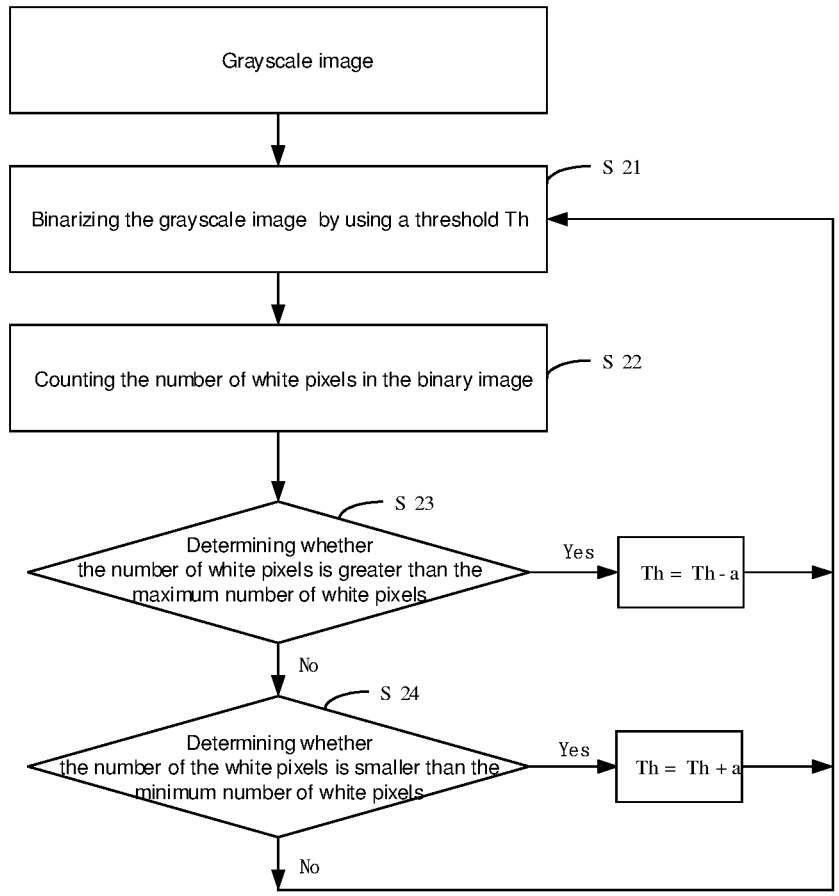
FIG. 2 is a schematic flow chart of an example process for adaptive threshold binarization according to an embodiment of the present disclosure.

Specifically, the processing flow for the adaptive threshold binarization, as shown in FIG. 2, may include:

S21, for binarizing a grayscale image of one frame by using a threshold Th.

S22, for counting the number of white pixels in the binary image of this frame.

S23, for determining whether the number of the white pixels is greater than the maximum number of white pixels, and if so, assigning Th+a to Th, and processing the grayscale image of the next frame (return to S21); or otherwise, processing the grayscale image of the next frame using Th.

In the embodiments of the present disclosure, by automatically adjusting the threshold, it can be ensured that on the basis of accurately obtaining the binary image, the influence of the factors such as noise and reflection on the connected domain marking is reduced.

In some embodiments, marking connected domains of pixels of the binary image and recording equivalent relationships, merging the equivalent connected domains according to the equivalent relationships for pixels with equivalent relationships in the marked results, storing the final marked results for all the pixels in a memory, and counting the number of pixels in each connected domain may include: traversing the pixels of the binary image row by row, marking the connected domain labels of each of the pixels and recording the equivalent relationships, wherein the equivalent relationships include intra-row equivalent relationships and inter-row equivalent relationships; when marking connected domains of pixels in the $i^{th}$ row and recording equivalent relationships, updating the connected domain labels of the pixels in the $(i-1)^{th}$ row according to the inter-row equivalent relationships existing between the pixels in the $(i-1)^{th}$ row and the pixels in the $i^{th}$ row; before marking connected domains of pixels in the $(i+1)^{th}$ row and recording equivalent relationships, updating the connected domain labels of the pixels in the $i^{th}$ row according to the intra-row equivalent relationships existing between the pixels in the $i^{th}$ row; storing the marked results of the pixels in the $(i-1)^{th}$ row in the memory and counting the number of pixels included in each connected domain in the memory according to the connected domain labels; until the final marked results of the pixels in the $N^{th}$ row is stored in the memory, obtaining the number of pixels included in all connected domains.

Wherein i has a value in a range from 2 to N, and N is the total row number of pixels of the binary image.

However, the present disclosure is not limited thereto, and in other embodiments, all or part of rows before the $i^{th}$ row may also be updated for the inter-row equivalent relationships (as a specific example, only the (i−1) row may be updated as described above). Also, in other embodiments, all or part of rows before the $i^{th}$ row may also be updated for the intra-row equivalent relationships. The reason for this is that there may be a case where a pattern similar to a "V" may appear in a binary image in which the upper left and upper right branches of the image converge downward and form a connected domain. In this case, if only the $(i-1)^{th}$ row is updated for the inter-row equivalent relationships and/or only the $i^{th}$ row is updated for the intra-row equivalent relationships as described above, corresponding connected domain labels in all rows prior to the $(i-1)^{th}$ row may not be correctly updated.

However, considering that a binary image of a pupil usually does not produce such a bifurcation in the field of pupil recognition as one of the fields of application of the embodiments of the present disclosure, the above technical solution of updating only the $(i-1)^{th}$ row for the inter-row equivalent relationships and updating only the $i^{th}$ row for the intra-row equivalent relationships may be also sufficient to determine the maximum connected domain. Even if there is a litter incorrect connected domain marking, it does not affect the determination of the maximum connected domain of the pupil. In addition, this bifurcation of pupil images can also be largely eliminated by using image preprocessing (e.g., erosion and/or dilation processes) to be mentioned later, avoiding the generation of incorrect connected domain marking.

In particular, when marking connected domains of pixels in the $2^{nd}$ row and recording equivalent relationships, the connected domain labels of the pixels in the $1^{st}$ row are updated according to the inter-row equivalent relationships existing between the pixels in the $1^{st}$ row and the pixels in the $2^{nd}$ row; before marking connected domains of pixels in the $3^{rd}$ row and recording equivalent relationships, the connected domain labels of the pixels in the $2^{nd}$ row are updated according to the intra-row equivalent relationships existing between the pixels in the $2^{nd}$ row; the connected domain labels of the pixels in the $1^{st}$ row are stored and the number of pixels included in each connected domain in the $1^{st}$ row is counted according to the connected domain labels; when marking connected domains of pixels in the $3^{rd}$ row and recording equivalent relationships, the connected domain labels of the pixels in the $2^{nd}$ row are updated according to the inter-row equivalent relationships existing between the pixels in the $2^{nd}$ row and the pixels in the $3^{rd}$ row; before marking connected domains of pixels in the $4^{th}$ row and recording equivalent relationships, the connected domain labels of the pixels in the $3^{rd}$ row are updated according to the intra-row equivalent relationships existing between the pixels in the $3^{rd}$ row; the connected domain labels of the pixels in the $2^{nd}$ row are stored and the number of pixels included in each connected domain in the $1^{st}$ row and the $2^{nd}$ row in the memory is counted, wherein for the pixels with the same connected domain label in the $2^{nd}$ row and the $1^{st}$ row, the number of pixels belonging to the same connected domain in the $2^{nd}$ row is added to the number of pixels included in the connected domain counted in the $1^{st}$ row; when marking connected domains of pixels in the $4^{th}$ row and recording equivalent relationships, the connected domain labels of the pixels in the $3^{rd}$ row are updated according to the inter-row equivalent relationships existing between the pixels in the $3^{rd}$ row and the pixels in the $4^{th}$ row; before marking connected domains of pixels in the $5^{th}$ row and recording equivalent relationships, the connected domain labels of the pixels in the $4^{th}$ row are updated according to the intra-row equivalent relationships existing between the pixels in the $4^{th}$ row; the connected domain labels of the pixels in the $3^{rd}$ row are stored and the number of pixels included in each connected domain in the $1^{st}$ row, the $2^{nd}$ row and the $3^{rd}$ row in the memory is counted; and so on, until the intra-row equivalent relationships and the inter-row equivalent relationships of the pixels in the $N^{th}$ row are completed and stored in the memory, the number of pixels in each connected domain is counted.

It should be noted that for the pixels in the $1^{st}$ row, according to the marking order, there may be no intra-row equivalent relationship, but only the inter-row equivalent relationship with the $2^{nd}$ row.

The embodiments of the present disclosure may adopt a pipeline parallel processing method, thereby improving the processing speed.

Figures 3, 4:
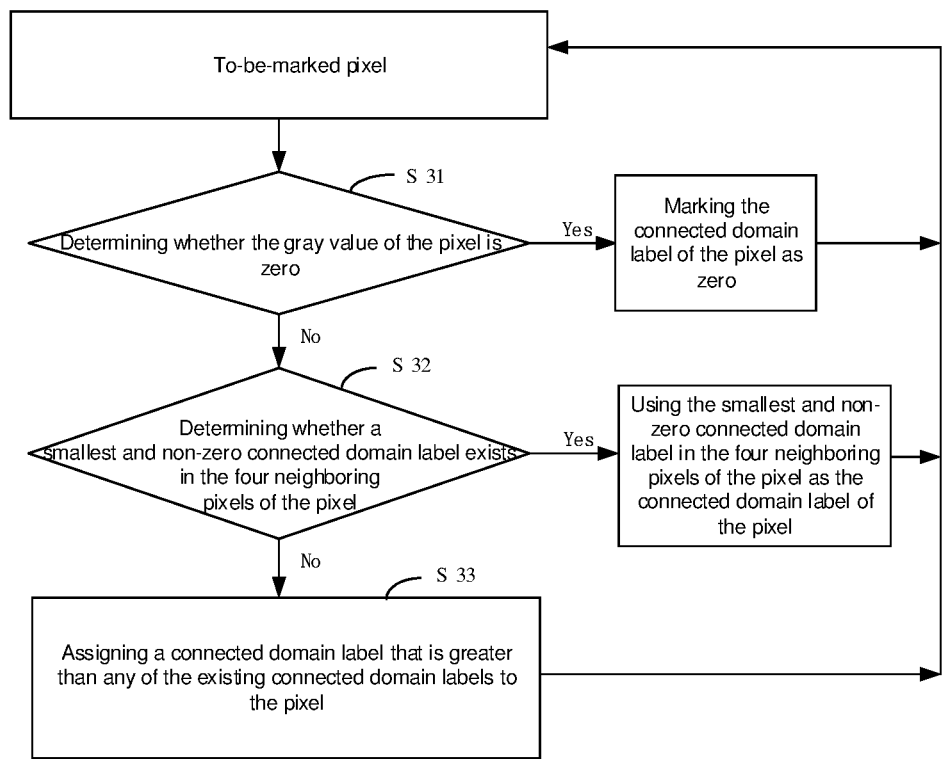
FIG. 3 is a schematic flow chart of an example of marking the connected domain labels of pixel according to an embodiment of the present disclosure.
FIG. 4 is a schematic diagram of an example position of four neighborhood pixels according to an embodiment of the present disclosure.

In some embodiments, as shown in FIG. 3, marking the connected domain label of the pixel may include:

S31, for determining whether the gray value of the pixel is zero; if zero, then marking the connected domain label of the pixel as zero; if the gray value of the pixel is not zero, then performing S32.

S32, for determining whether a smallest and non-zero connected domain label exists in the four neighboring pixels of the pixel, and if so, the smallest and non-zero connected domain label in the four neighboring pixels of the pixel is the connected domain label of the pixel; otherwise performing S33. In the present embodiment, the four neighboring pixels of the pixel having the coordinate (x, y) may be respectively pixels having the coordinates (x−1, y−1), (x−1, y), (x−1, y+1) and (x, y−1); x is the row number of the pixel in the binary image, and y is the column number of the pixel in the binary image. However, the present disclosure is not limited thereto. For example, other neighborhood pixels are also possible. For example, the pixels having the coordinates (x−1, y−1), (x−1, y), (x−1, y+1) and (x, y+1) may be used as the four neighborhood pixels when writing and reading in an order from right to left and from top to bottom. In addition, two neighborhoods (e.g., diagonally adjacent pixels, or pixels in the upper left and left sides are not considered as neighborhood pixels), three neighborhoods (e.g., neighboring pixels in the upper left or upper right are not considered as neighborhood pixels) or the like may be used.

S33, assigning a connected domain label that is greater than any of the existing connected domain labels to the pixel.

As an example, as shown in FIG. 4, a connected domain label of a pixel having a coordinate of (x−1, y−1) is marked as label1, a connected domain label of a pixel having a coordinate of (x−1, y) is marked as label2, a connected domain label of a pixel having a coordinate (x−1, y+1) is marked as label3, and a connected domain label of a pixel having a coordinate (x, y−1) is marked as label4. When marking the connected domain label labelx of a to-be-marked pixel with the coordinate (x, y), firstly, it should be determined whether the gray value of the pixel is zero. If it is zero, the connected domain label of the pixel is marked as zero, and if it is not zero, it is determined whether a smallest and non-zero connected domain label exists among label1, label2, label3 and label4. If there exists, the smallest and non-zero connected domain label is used as the connected domain label of the pixel; otherwise the pixel is assigned a connected domain label greater than any of the existing connected domain labels.

It should be noted that since the row number and the column number all start counting from 1, if x−1 is smaller than 1, the corresponding pixel does not exist. In the same way, if y−1 is smaller than 1, the corresponding pixel does not exist either. In this case, other methods such as the above two neighborhoods and three neighborhoods may be used to determine the connected domain labels. In addition, in the marking process, the gray value of each pixel in the edge region of the binary image is almost zero. Therefore, for the pixel whose gray value is not zero, four neighborhood pixels generally exist in the periphery thereof.

After the connected domains of the pixels are marked by the above method, there is no intra-row equivalent relationship for pixels in the first row.

In some embodiments, recording the equivalent relationships may include: determining whether the connected domain labels of the pixel having the coordinates (x, y−1) and (x−1, y+1) are zero respectively when the connected domain label of the pixel having the coordinate (x, y) is not zero; if not zero, and the connected domain labels of the corresponding pixel and the pixel having the coordinate (x, y) are not equal, recording the equivalent relationship between the two connected domain labels.

Wherein, if the two connected domain labels with equivalent relationship are located in the same row, they have the intra-row equivalent relationship; if the two connected domain labels with equivalent relationship are located in adjacent rows, they have the inter-row equivalent relationship.

It should be understood that the above corresponding pixel refers to a pixel whose connected domain is not zero among the pixels with the coordinates (x, y−1) and (x−1, y+1).

In addition, the two connected domain labels with the equivalent relationship are located in the same row, that is, the pixels corresponding to the two connected domain labels are located in the same row. The two connected domain labels with the equivalent relationship are located in adjacent rows, that is, the pixels corresponding to the two connected domain labels are located in adjacent rows.

As an example, two rows are shown in Table 1 below, for example, the connected domain labels of the pixels in the fourth row and the fifth row. Wherein, in the table, only 12 columns are indicated for each row of pixels (that is, from column 1 to column 12), and the connected domain labels of the pixels not marked in the table are zero.

TABLE 1

|  | 1 | 2 | 3 | 4 | 5 | 6 | 7 | 8 | 9 | 10 | 11 | 12 |
|---|---|---|---|---|---|---|---|---|---|---|---|---|
| Row 3 |  |  |  |  |  |  |  |  |  |  |  |  |
| Row 4 |  |  |  |  | 1 | 1 | 1 |  |  | 2 | 2 | 2 |
| Row 5 |  | 3 | 3 | 1 | 1 | 1 | 1 | 1 |  |  |  |  |

As shown in Table 1, when marking a pixel in column 4 of row 5, it should first be determined whether it is a black pixel or a white pixel based on the corresponding pixel value in its binary image, and if it is a white pixel, then marked as 0, or left blank as the other pixels in the above table (for example, the pixel in column 1 of row 3), and if it is a black pixel, then the smallest and non-zero connected domain label in the four neighboring pixels (that is, pixels having coordinates (5,3), (4,5), (4,4), (4,3)) is marked as 1, and thus the connected domain label of the current pixel is marked as "1"; and then, the connected domain labels of the pixels having coordinates (5,3), (4,5) are determined, wherein the connected domain labels of the pixels having coordinates (5,3), (4,5) are respectively 3 and 1, the connected domain label of the pixel having the coordinate (5,3) is not zero and is not equal to the connected domain label of the current pixel, that is, the pixel having the coordinate (5,4), and thus the equivalent relationship of "3" and "1" is recorded. Among them, because the two are in the same row, it is the intra-row equivalent relationship.

When marking a pixel in column 8 of row 5, it should first be determined whether it is a black pixel or a white pixel based on the corresponding pixel value in its binary image, and if it is a white pixel, then marked as 0, or left blank as the other pixels in the above table (for example, the pixel in column 1 of row 3), and if it is a black pixel, then the smallest and non-zero connected domain label in the four neighboring pixels (that is, pixels having coordinates (5,7), (4,7), (4,8), (4,9)) is marked as 1, and thus the connected domain label of the current pixel is marked as "1"; and then, the connected domain labels of the pixels having coordinates (5,7), (4,9) are determined, wherein the connected domain labels of the pixels having coordinates (5,7), (4,9) are respectively 1 and 2, the connected domain label of the pixel having the coordinate (4,9) is not zero and is not equal to the connected domain label of the current pixel, that is, the pixel having the coordinate (5,8), and thus the equivalent relationship of "2" and "1" is recorded. Among them, because the two are in different rows, it is the inter-row equivalent relationship.

Further, updating the connected domain labels of the pixels in the $(i-1)^{th}$ row according to the inter-row equivalent relationships existing between the pixels in the $(i-1)^{th}$ row and the pixels in the $i^{th}$ row may include: according to the inter-row equivalent relationships existing between the pixels in the $(i-1)^{th}$ row and the pixels in the $i^{th}$ row, changing the greater connected domain label in the pixel in the $(i-1)^{th}$ row to the smaller connected domain label equivalent to it.

Updating the connected domain labels of the pixels in the $i^{th}$ row according to the intra-row equivalent relationships existing between the pixels in the $i^{th}$ row may include: according to the intra-row equivalent relationships existing between the pixels in the $i^{th}$ row, changing the greater connected domain label in the pixel in the $i^{th}$ row to the smaller connected domain label equivalent to it.

Exemplarily, taking the two rows of pixels in Table 1 as an example, since there is an inter-row equivalent relationship between "2" and "1" in the pixels in the fourth and fifth rows, according to the inter-row equivalent relationship between the pixels in the fourth and fifth rows, the greater connected domain label "2" in the fourth row is changed to the smaller connected domain label "1" equivalent to the fourth row when updating the connected domain label of the fourth row of pixels, and as shown in Table 2 below after changing.

Since there is an intra-row equivalent relationship between "3" and "1" in the pixels in the fifth row, according to the intra-row equivalent relationship between the pixels in the fifth row, the greater connected domain label "3" in the fifth row is changed to the smaller connected domain label "1" equivalent to the fifth row when updating the connected domain label of the fifth row of pixels, and as shown in Table 2 below after changing.

TABLE 2

|       | 1 | 2 | 3 | 4 | 5 | 6 | 7 | 8 | 9 | 10 | 11 | 12 |
|-------|---|---|---|---|---|---|---|---|---|----|----|----|
| Row 3 |   |   |   |   |   |   |   |   |   |    |    |    |
| Row 4 |   |   |   |   | 1 | 1 | 1 |   | 1 | 1  | 1  |    |
| Row 5 |   | 1 | 1 | 1 | 1 | 1 | 1 | 1 |   |    |    |    |

In some embodiments, when marking connected domains of pixels in the $i^{th}$ row and recording equivalent relationships, updating the connected domain labels of the pixels in the $(i-1)^{th}$ row according to the inter-row equivalent relationships existing between the pixels in the $(i-1)^{th}$ row and the pixels in the $i^{th}$ row may include: when marking the connected domains of the first row of pixels and recording the equivalent relationships, transferring the connected domain labels of the $(i-1)^{th}$ row of pixels once between two shift registers, and in the transferring process, updating the connected domain labels of the pixels in the $(i-1)^{th}$ row according to the inter-row equivalent relationships existing between the pixels in the $(i-1)^{th}$ row and the pixels in the $i^{th}$ row.

Before marking connected domains of pixels in the $(i+1)^{th}$ row and recording equivalent relationships, updating the connected domain labels of the pixels in the $i^{th}$ row according to the intra-row equivalent relationships existing between the pixels in the $i^{th}$ row may include: before marking the connected domains of pixels in the $(i+1)^{th}$ row and recording equivalent relationships, transferring the connected domain labels of the $i^{th}$ row of pixels once between two shift registers, and in the transferring process, updating the connected domain labels of the pixels in the $i^{th}$ row according to the intra-row equivalent relationships existing between the pixels in the $i^{th}$ row.

Specifically, when marking the connected domains of the second row of pixels and recording the equivalent relationships, the connected domain labels of the first row of pixels are transferred once between two shift registers, and in the transferring process, the connected domain labels of the pixels in the first row are updated according to the inter-row equivalent relationships existing between the pixels in the first row and the pixels in the second row; before marking the connected domains of pixels in the third row and recording equivalent relationships, the connected domain labels of the second row of pixels are transferred once between two shift registers, and in the transferring process, the connected domain labels of the pixels in the second row are updated according to the intra-row equivalent relationships existing between the pixels in the second row; when marking the connected domains of the third row of pixels and recording the equivalent relationships, the connected domain labels of the second row of pixels are transferred once between two shift registers, and in the transferring process, the connected domain labels of the pixels in the second row are updated according to the inter-row equivalent relationships existing between the pixels in the second row and the pixels in the third row; before marking the connected domains of pixels in the fourth row and recording equivalent relationships, the connected domain labels of the third row of pixels are transferred once between two shift registers, and in the transferring process, the connected domain labels of the pixels in the third row are updated according to the intra-row equivalent relationships existing between the pixels in the third row; when marking the connected domains of the fourth row of pixels and recording the equivalent relationships, the connected domain labels of the third row of pixels are transferred once between two shift registers, and in the transferring process, the connected domain labels of the pixels in the third row are updated according to the inter-row equivalent relationships existing between the pixels in the third row and the pixels in the fourth row; before marking the connected domains of pixels in the fifth row and recording equivalent relationships, the connected domain labels of the fourth row of pixels are transferred once between two shift registers, and in the transferring process, the connected domain labels of the pixels in the fourth row are updated according to the intra-row equivalent relationships existing between the pixels in the fourth row; and so on, until the intra-row equivalent relationship and the inter-row equivalent relationship of the pixel in the $N^{th}$ row are completed.

That is, only two shift registers are needed to achieve the updating of the connected domain marking of all the rows, and therefore, the maximum connected domain and the coordinates of all the boundary points in the image can be obtained with less storage resources.

Figure 5:
FIG. 5 is a schematic flow chart of another example of a maximum connected domain marking method according to an embodiment of the present disclosure.

Based on this, a maximum connected domain marking method, as shown in FIG. 5, may include:

S1: in the scan stage for the first row of pixels, traversing the first row of pixels from left to right one by one, marking the connected domain label of each pixel and recording the equivalent relationships, and sequentially inputting the initial marked results to a first shift register.

S2: in the scan stage for the second row of pixels, traversing the second row of pixels from left to right one by one, marking the connected domain labels of each pixel and recording the equivalent relationships, and sequentially inputting the marked results to the first shift register, at the same time, the output terminal of the first shift register sequentially outputs the initial marked results of the pixels in the first row; and updating the connected domain labels of the pixels in the first row according to the inter-row equivalent relationships between the pixels in the first row and the pixels in the second row, to obtain the finally marked results and sequentially inputting the same to a second shift register.

Figure 6:
FIG. 6 is a schematic diagram of an example of a shift register according to an embodiment of the present disclosure.

Here, for the first shift register, one end of the first shift register is an input terminal and the other end is an output terminal (as shown in FIG. 6). When one marked result of the second row of pixels is input, the output terminal of the first shift register may output one initial marked result of the first row of pixels.

Similarly, the second shift register works the same as the first shift register.

S3: in the transitional stage for adjacent row scan, the first shift register is written with zero data while the output terminal of the first shift register sequentially outputs the initial marked results of the pixels in the second row, and according to the intra-row equivalent relationship between the pixels in the second row, the connected domain labels of the pixels in the second row are updated to obtain the intermediate marked results and sequentially input the same to the second shift register; the output terminal of the second shift register sequentially outputs the final marked results of the pixels in the first row to be stored in the memory, and the number of pixels included in each connected domain in the memory is counted according to the connected domain labels.

S4: in the scan stage for the third row of pixels, traversing the third row of pixels from left to right one by one, marking the connected domain label of each pixel and recording the equivalent relationships, and sequentially inputting the initial marked results to the second shift register, at the same time, the output terminal of the second shift register sequentially outputs the intermediate marked results of the pixels in the second row; and updating the connected domain labels of the pixels in the second row according to the inter-row equivalent relationships between the pixels in the second row and the pixels in the third row, to obtain the finally marked results and sequentially inputting the same to the first shift register.

S5: in the transitional stage for adjacent row scan, the second shift register is written with zero data while the output terminal of the second shift register sequentially outputs the initial marked results of the pixels in the third row, and according to the intra-row equivalent relationship between the pixels in the third row, the connected domain labels of the pixels in the third row are updated to obtain the intermediate marked results and sequentially input the same to the first shift register; the output terminal of the first shift register sequentially outputs the final marked results of the pixels in the second row to be stored in the memory, and the number of pixels included in each connected domain in the memory is counted.

S6: S4-S5 are performed on each subsequent row of pixels, wherein, when traversing the $M^{th}$ row of pixels, the initial marked results for the pixels in the $M^{th}$ row are sequentially input into a non-zero shift register, $4 \leq M \leq N$; until the final marked results of the pixels in the last row are stored in the memory, the number of pixels included in all the connected domains is obtained.

S7: determining the connected domain label of the maximum connected domain according to the counted number of pixels in each connected domain.

S8: sequentially reading the connected domain labels stored in the memory and generating row counts and column counts simultaneously, and recording the coordinates of all the pixels in the first row and the last row in the maximum connected domain and the coordinates of two boundary points on the left and right of the middle rows; wherein the coordinates include the row count and the column count of the corresponding pixel.

It should be noted that, S4-S5 are performed on each subsequent row of pixels from the fourth row. It may be understood that since S4-S5 are specifically the scan stage of the third row of pixels and the transitional stage of adjacent row scan, from the pixels in the fourth row, when being performed in accordance with the S4-S5, S4-S5 are accordingly the scan stage of the $M^{th}$ row of pixels and the transitional stage of adjacent row scan. Specifically, in the corresponding step, the specific row number should change with the change in M.

In addition, when traversing the $M^{th}$ row of pixels, the initial marked results of the $M^{th}$ row of pixels may be sequentially input to the non-zero shift register, and correspondingly, the non-zero shift register may sequentially output the intermediate marked results of the $(M-1)^{th}$ row of pixels. Since a write zero data operation is performed on one of the first shift register and the second shift register during the transitional stage of adjacent row scan before traversing the $M^{th}$ row of pixels, the non-zero shift register is a shift register in the first shift register and the second shift register in which zero data is not written.

For example, when M=4, the performing of S4 may include specifically: in the scan stage of the fourth row of pixels, traversing the fourth row of pixels from left to right one by one, marking the connected domain labels of each pixel and recording the equivalent relationships, and sequentially inputting the initial marked results to the first shift register, at the same time, the output terminal of the first shift register sequentially outputs the intermediate marked results of the pixels in the third row; and updating the connected domain labels of the pixels in the third row according to the inter-row equivalent relationships between the pixels in the third row and the pixels in the fourth row, to obtain the finally marked results and sequentially inputting the same to the second shift register.

And the performing of S5 may include specifically: in the transitional stage of adjacent row scan, the first shift register is written with zero data and the output terminal of the first shift register sequentially outputs the initial marked results of the pixels in the fourth row, and according to the intra-row equivalent relationship between the pixels in the fourth row, the connected domain labels of the pixels in the fourth row are updated to obtain the intermediate marked results and sequentially input the same to the second shift register; the output terminal of the second shift register sequentially outputs the final marked results of the pixel in the third row to be stored in the memory, and the number of pixels included in each connected domain in the memory is counted.

For another example, when M=5, the performing of S4 may include specifically: in the scan stage of the fifth row of pixels, traversing the fifth row of pixels from left to right one by one, marking the connected domain labels of each pixel and recording the equivalent relationships, and sequentially inputting the initial marked results to the second shift register, at the same time, the output terminal of the second shift register sequentially outputs the intermediate marked results of the pixels in the fourth row; and updating the connected domain labels of the pixels in the fourth row according to the inter-row equivalent relationships between the pixels in the fourth row and the pixels in the fifth row, to obtain the finally marked results and sequentially inputting the same to the first shift register.

And the performing of S5 may include specifically: in the transitional stage of adjacent row scan, the second shift register is written with zero data and the output terminal of the second shift register sequentially outputs the initial marked results of the pixels in the fifth row, and according to the intra-row equivalent relationship between the pixels in the fifth row, the connected domain labels of the pixels in the fifth row are updated to obtain the intermediate marked results and sequentially input the same to the first shift register; the output terminal of the fifth shift register sequentially outputs the final marked results of the pixel in the fourth row to be stored in the memory, and the number of pixels included in each connected domain in the memory is counted.

For another example, when M=6, the performing of S4 may include specifically: in the scan stage of the sixth row of pixels, traversing the sixth row of pixels from left to right one by one, marking the connected domain labels of each pixel and recording the equivalent relationships, and sequentially inputting the initial marked results to the first shift register, at the same time, the output terminal of the first shift register sequentially outputs the intermediate marked results of the pixels in the fifth row; and updating the connected domain labels of the pixels in the fifth row according to the inter-row equivalent relationships between the pixels in the fifth row and the pixels in the sixth row, to obtain the finally marked results and sequentially inputting the same to the second shift register.

And the performing of S5 may include specifically: in the transitional stage of adjacent row scan, the first shift register is written with zero data and the output terminal of the first shift register sequentially outputs the initial marked results of the pixels in the sixth row, and according to the intra-row equivalent relationship between the pixels in the sixth row, the connected domain labels of the pixels in the sixth row are updated to obtain the intermediate marked results and sequentially input the same to the second shift register; the output terminal of the second shift register sequentially outputs the final marked results of the pixel in the fifth row to be stored in the memory, and the number of pixels included in each connected domain in the memory is counted.

In addition, if there is no inter-row equivalent relationship between the $(i-1)^{th}$ row of pixels and the $i^{th}$ row of pixels, it is not necessary to update the connected domain labels of the $(i-1)^{th}$ row of pixels. Similarly, if there is no intra-row equivalent relationship between pixels in any row, it is not necessary to update the connected domain labels of the row.

It should be understood that, whether to update the connection domain labels of a certain row according to the inter-row equivalent relationship or update the connection domain labels of a certain row according to the intra-row equivalent relationship, only the connected domain labels of the pixels of recording the equivalent relationship in the corresponding row are updated, and the connected domain labels of the remaining pixels of not recording the equivalent relationship are not updated.

Based on the above, in some embodiments, before the binarization processing is performed on the grayscale image to obtain the binary image, the marking method may further include: performing cropping and noise reduction processing on the grayscale image.

Wherein, the purpose of cropping the grayscale image is to crop out the target area.

Taking the maximum connected domain marking method applied to an augmented reality/virtual reality apparatus to achieve pupil tracking as an example, since the scope of the eye image captured by the camera is relatively large and all we need is only the image of the pupil, the cropping may be performed first to obtain the target area, that is, the edges of the eye image may be removed to reduce the amount of data to be processed subsequently. For example, a filtering algorithm may be used later to perform noise reduction processing.

In some embodiments, before marking the connected domains of pixels in the binary image and recording the equivalent relationships, the marking method may further include: performing erosion and dilation processing on the binary image.

That is, after the grayscale image is binarized, the binary image is subjected to erosion and dilation processing before marking the connected domains of pixels in the binary image and recording the equivalent relationships.

Taking the maximum connected domain marking method applied to an augmented reality/virtual reality apparatus to achieve pupil tracking as an example, a smaller-area white pixel in the binary image due to noise or the like may be removed by the erosion operation, and for a black area in the pupil region due to the reflection by the infrared light, it may be filled using the dilation operation, in order to reduce the complexity of subsequent connected domain marking.

An embodiment of the present disclosure further provides a method for target tracking, comprising: calculating a position coordinate of a center of a target according to the maximum connected domain and its coordinates of all the boundary points obtained by the above method.

For example, the target may be a pupil.

When pupil tracking is performed, a grayscale image of an eye needs to be acquired, and the grayscale image may be an eye image acquired by an image sensor, or an image converted from an eye image acquired by an image sensor. The binary image may be obtained by binarizing the grayscale image of the eye.

The image sensor may be a camera.

Based on this, when binarizing the grayscale image of the eye, for a pixel whose gray value is greater than a threshold, the gray value should be set to 0; and for a pixel whose gray value is less than the threshold, the gray value is set to 1.

The mainstream technology of pupil tracking is realized by the image processing method. In order to accurately calculate the position of the pupil center, the coordinates of the boundary points in the pupil region are required (in a head-mounted augmented reality/virtual reality apparatus, considering the structure of the actual apparatus and the position of the image sensor, it is considered that the image formed by the pupil is the maximum connected domain in the binary image), and the coordinates of the boundary points in the pupil region may be obtained through the maximum connected domain marking method as above.

Figure 7:
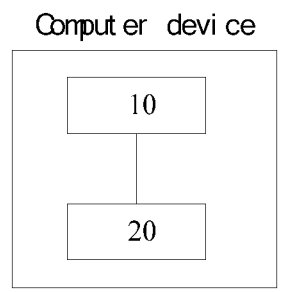
FIG. 7 is a schematic diagram of an example of a computer device according to an embodiment of the present disclosure.

An embodiment of the present disclosure further provides a computer device, as shown in FIG. 7, comprising a storage unit 10 and a processing unit 20. The storage unit 10 may store a computer program that can run on the processing unit 20 and store marked results. The processing unit 20 may implement the maximum connected domain marking method or the pupil tracking method as described above when executing the computer program.

It should be noted that, the processing unit may include an FPGA (Field Programmable Gate Array). In this case, the computer program stored in the storage unit may be a Very-High-Speed Integrated Circuit Hardware (VHDL or Verilog). The FPGA running the above computer program means that according to the digital logic circuit generated by VHDL, FPGA performs selection and connection editing to the FPGA's own internal logic gate circuits, and achieves the program's intended function. The FPGA includes shift register resources, for the transfer operation of non-final results (input and/or output).

An Embodiment of the present disclosure also provides a computer-readable medium storing a computer program, wherein the computer program is executed by a processor to implement the maximum connected domain marking method or the pupil tracking method as described above.

Figure 8:
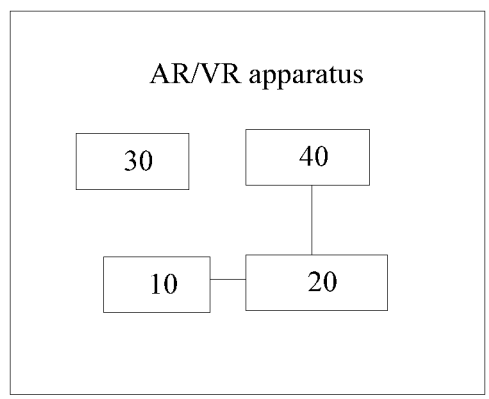
FIG. 8 is a schematic diagram of an example of an Augmented Reality/Virtual Reality apparatus according to an embodiment of the present disclosure.

An embodiment of the present disclosure further provides an augmented reality/virtual reality apparatus, as shown in FIG. 8, including an augmented reality/virtual reality body 30, an image sensor 40 disposed inside the augmented reality/virtual reality body 30, a storage unit 10 and a processing unit 20 disposed on the augmented reality/virtual reality body 30. The image sensor 40 may be configured to capture an eye image; and the storage unit 10 may store a computer program executable on the processor. The processing unit 20 may implement the pupil tracking method as described above when executing the computer program.

The processing unit may include an FPGA.

The foregoing is merely specific embodiments of the present disclosure, but the protection scope of the present disclosure is not limited thereto. Any modification or replacement that can be easily thought of by persons skilled in the art within the technical scope disclosed in the present disclosure shall fall within the protection scope of the present disclosure. Therefore, the protection scope of the present disclosure should be based on the protection scope of the claims.

We claim:

1. A target tracking method, comprising:
obtaining a maximum connected domain by a method comprising:
marking connected domains of pixels of a binary image and recording equivalent relationships of equivalent connected domains;
merging the equivalent connected domains according to the equivalent relationships, for pixels with the equivalent relationships in the marked results;
counting the number of pixels in each merged connected domain;
determining a connected domain label for the maximum connected domain according to the counted number of pixels in each connected domain; and
determining coordinates of boundary pixels in the maximum connected domain based on the connected domain label; and
calculating a position coordinate of a center of a target according to the obtained maximum connected domain and coordinates of all its boundary points.

2. The target tracking method according to claim 1, wherein:
the binary image is obtained by binarizing a grayscale image of an eye, the grayscale image being an eye image acquired by an image sensor, or an image converted from an eye image acquired by an image sensor; and
when binarizing the grayscale image, for a pixel whose gray value is greater than a threshold, the gray value is set to 0, and for a pixel whose gray value is less than the threshold, the gray value is set to 1.

3. A computer device, comprising a storage unit and a processing unit; the storage unit stores a computer program that is executable on the processing unit and stores marked results; and the processing unit implements the method of claim 1 when executing the computer program.

4. A non-transitory computer-readable medium storing a computer program, wherein the computer program is executable by a processor to implement the method of claim 1.

5. An augmented reality/virtual reality apparatus, comprising an augmented reality/virtual reality body, an image sensor disposed inside the augmented reality/virtual reality body, and a storage unit and a processing unit disposed on the augmented reality/virtual reality body, wherein
the image sensor is configured to capture an eye image;
the storage unit stores a computer program executable on the processing unit; and
the processing unit implements the method of claim 1 when executing the computer program.

6. The augmented reality/virtual reality apparatus according to claim 5, wherein the processing unit comprises a Field Programmable Gate Array (FPGA).

7. A computer device, comprising a storage unit and a processing unit, wherein the storage unit stores a computer program that is executable on the processing unit and stores marked results; and the processing unit implements a maximum connected domain marking method when executing the computer program, the maximum connected domain marking method comprising:
marking connected domains of pixels of a binary image and recording equivalent relationships of equivalent connected domains;
merging the equivalent connected domains according to the equivalent relationships, for pixels with the equivalent relationships in the marked results;
counting the number of pixels in each merged connected domain;
determining a connected domain label for the maximum connected domain according to the counted number of pixels in each connected domain; and
determining coordinates of boundary pixels in the maximum connected domain based on the connected domain label.

8. A non-transitory computer-readable medium storing a computer program, wherein the computer program is executed by a processor to implement a maximum connected domain marking method that comprises:
marking connected domains of pixels of a binary image and recording equivalent relationships of equivalent connected domains;
merging the equivalent connected domains according to the equivalent relationships, for pixels with the equivalent relationships in the marked results;
counting the number of pixels in each merged connected domain;
determining a connected domain label for the maximum connected domain according to the counted number of pixels in each connected domain; and
determining coordinates of boundary pixels in the maximum connected domain based on the connected domain label.

* * * * *